United States Patent [19]
Matsumoto et al.

[11] Patent Number: 6,010,072
[45] Date of Patent: *Jan. 4, 2000

[54] HAND SCANNER MOVABLE OVER A DOCUMENT WITHOUT MEANDERING

[75] Inventors: Yasushi Matsumoto; Toru Uchida, both of Tokyo, Japan

[73] Assignee: NEC Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,699

[22] Filed: May 19, 1997

[30] Foreign Application Priority Data

May 20, 1996 [JP] Japan ..................................... 8-124528
Jun. 28, 1996 [JP] Japan ..................................... 8-169694

[51] Int. Cl.[7] ..................................................... G06K 7/10
[52] U.S. Cl. ...................... 235/472.01; 235/473; 250/566
[58] Field of Search .................................... 235/472, 473, 235/472.01; 250/566, 568; 188/85, 184

[56] References Cited

U.S. PATENT DOCUMENTS

| | | | |
|---|---|---|---|
| 4,703,186 | 10/1987 | Nakayama et al. | 235/472 |
| 4,793,812 | 12/1988 | Sussman et al. | 235/472 |
| 4,959,871 | 9/1990 | Mori et al. | 235/472 |
| 5,227,909 | 7/1993 | Watson | 235/472 |
| 5,306,908 | 4/1994 | McConica | 235/472 |
| 5,586,212 | 12/1996 | McConica | 235/473 |

FOREIGN PATENT DOCUMENTS

| | | |
|---|---|---|
| 62-272657 | 11/1987 | Japan . |
| 63-40445 | 2/1988 | Japan . |
| 63-61861 | 4/1988 | Japan . |
| 1-119258 | 8/1989 | Japan . |

*Primary Examiner*—Donald Hajec
*Assistant Examiner*—Daniel St. Cyr
*Attorney, Agent, or Firm*—Ostrolenk, Faber, Gerb & Soffen, LLP

[57] ABSTRACT

A hand scanner for scanning a document by being moved by hand and sending the resulting image data to a host is disclosed. The scanner is easily movable over a document without meandering. Because the scanner includes a minimum number of parts, it is small in size and simple in configuration.

5 Claims, 8 Drawing Sheets

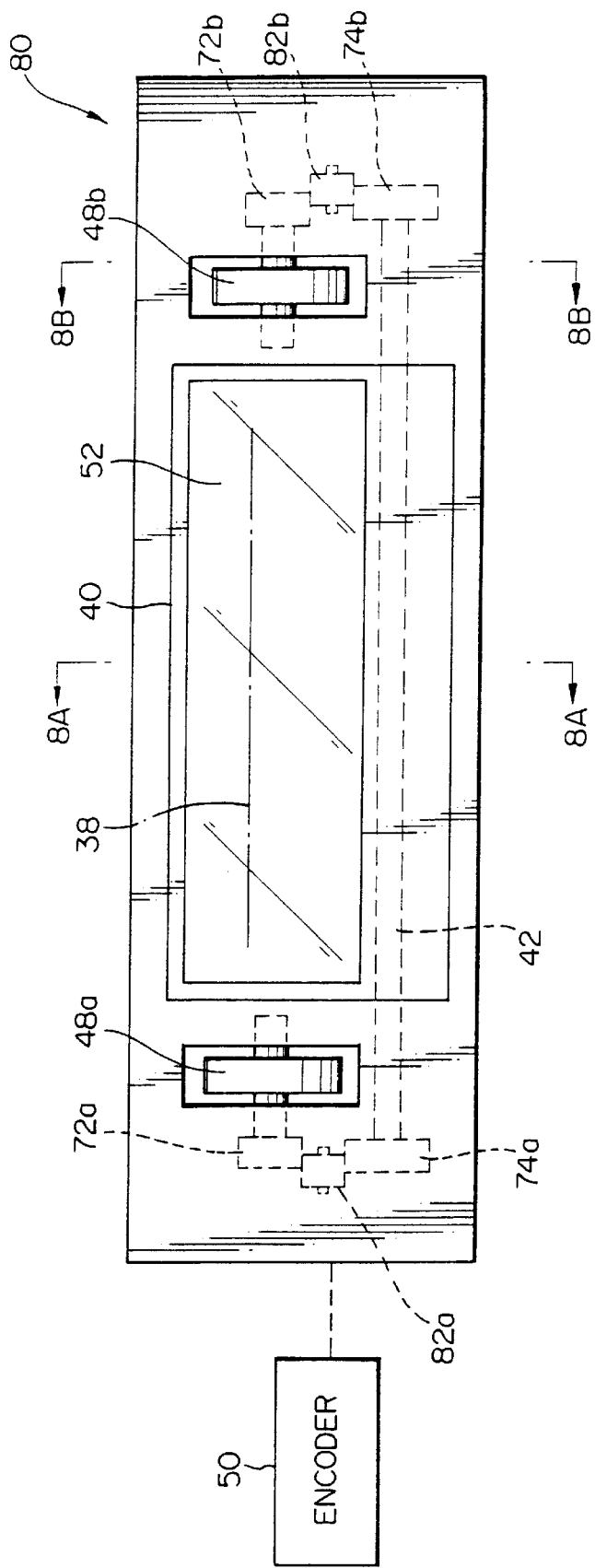

6,010,072

1

HAND SCANNER MOVABLE OVER A DOCUMENT WITHOUT MEANDERING

BACKGROUND OF THE INVENTION

The present invention relates to a hand scanner or image inputting device and, more particularly, to a hand scanner for scanning a document by being moved by hand and sending the resulting image data to a host.

Today, a hand scanner is extensively used with a personal computer or a word processor as an image inputting device for optically reading image data out of a document by being operated by hand. A conventional hand scanner includes a document reading section and a pair of rollers positioned at both sides of the reading section. The rollers are rollable on a document so as to allow the scanner to read a document image over a broad area. It is a common practice to arrange the rollers such that they rotate independently of each other or rotate in interlocked relation to each other. However, the problem with the rollers rotatable independently of each other is that they are apt to cause the scanner to meander while moving over a document. Image data output from the meandering scanner must be corrected by a time- and labor-consuming procedure. On the other hand, the interlocked roller scheme is not practicable unless the scanner additionally includes a shaft and gears for operatively connecting the two rollers. This kind of scheme therefore increases the number of parts and the cost. Moreover, the shaft and gears for connecting the rollers need an extra space and result in a complicated bulky configuration.

An example of prior art hand scanners is taught in Japanese Patent Laid-Open Publication No. 2-51971.

SUMMARY OF THE INVENTION

It is therefore an object of the present invention to provide a hand scanner easy to operate and capable of scanning a document without meandering.

It is another object of the present invention to provide a hand scanner having a simple miniature configuration due to a decrease in the number of parts constituting it.

In accordance with the present invention, a hand scanner has a light source for illuminating a document, a sensor for transforming the resulting reflection from the document received via a document reading section to a corresponding electric signal, a frame supporting the light source and sensor, a rotatable shaft extending throughout the frame, and a pair of rollers affixed to opposite ends of the shaft.

Also, in accordance with the present invention, a hand scanner has a light source for illuminating a document, a sensor for transforming the resulting reflection from the document received via a document reading section to a corresponding electric signal, a frame supporting the light source and sensor, a shaft extending throughout the frame, a pair of rollers mounted on the frame at both sides of the frame with respect to the main scanning direction, and a transmitting mechanism for transmitting the rotation of the rollers to the shaft. The shaft extends throughout the central portion of the frame.

Further, in accordance with the present invention, a hand scanner has a light source for illuminating a document, a sensor for transforming the resulting reflection from the document received via a document reading section to a corresponding electric signal, a frame supporting the light source and sensor, a shaft extending throughout the frame, a pair of rollers positioned at both sides of the frame with respect to the main scanning direction, a transmitting

2 mechanism for transmitting the rotation of the rollers to the shaft, a pair of roller gears coaxial with the pair of rollers, respectively, a pair of shaft gears coaxial with the shaft, and a pair of intermediate gears each meshing with one of the pair of roller gears and one of the pair of shaft gears.

BRIEF DESCRIPTION OF THE DRAWINGS

The above and other objects, features and advantages of the present invention will become apparent from the following detailed description taken with the accompanying drawings in which:

FIG. 7 is a bottom view showing a modification of the embodiment of FIG. 5;

DESCRIPTION OF THE PREFERRED EMBODIMENTS

Figure 1:
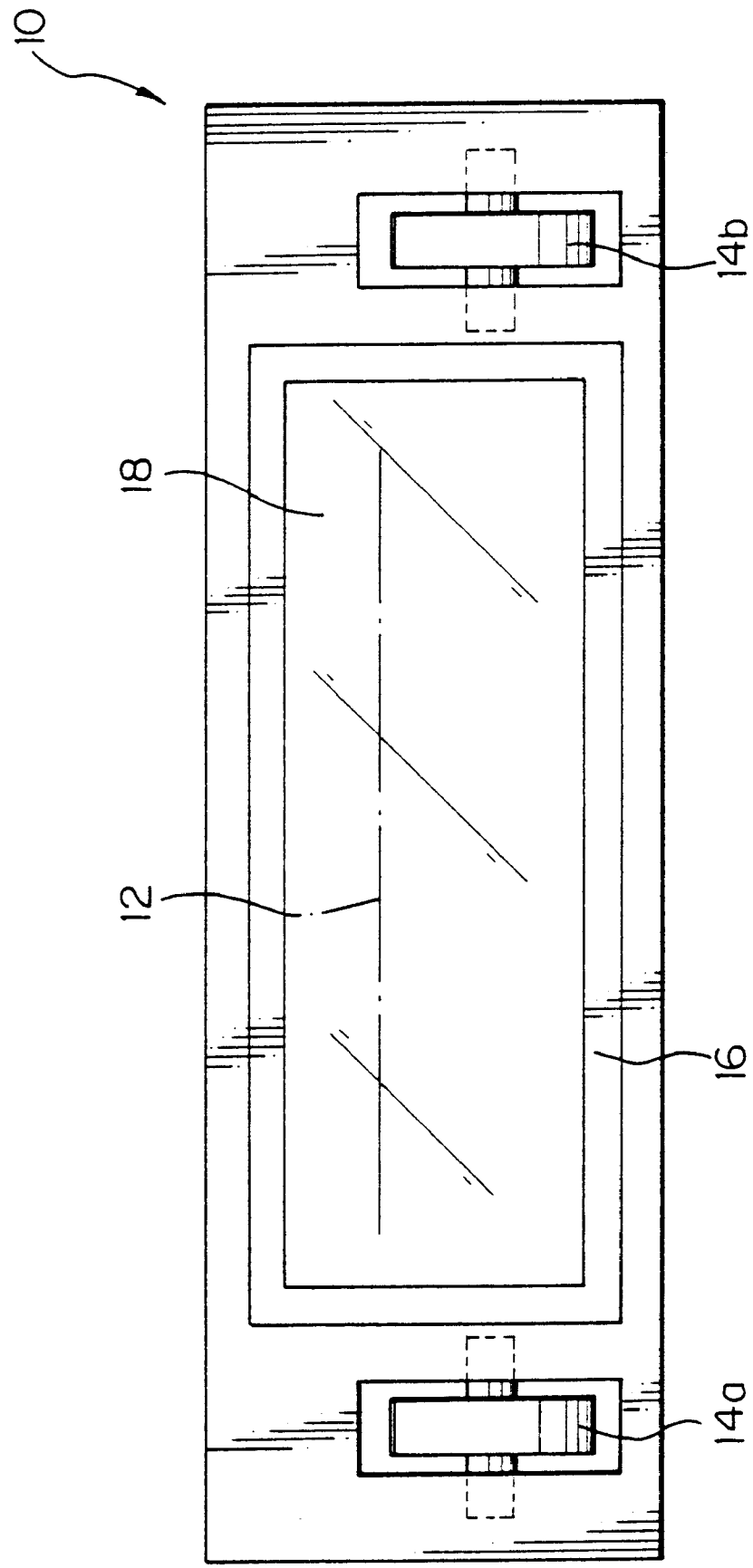
FIGS. 1 and 2 are bottom views each showing a particular conventional hand scanner.

To better understand the present invention, brief reference will be made to a conventional hand scanner, shown in FIG. 1. As shown, the hand scanner, generally 10, has two rollers 14a and 14b positioned at both sides of a document reading section 12 and rotatable independently of each other.

To read a document, the scanner 10 is moved over the document with the rollers 14a and 14b rolling on the document. The scanner 10 is capable of reading the document via the reading section 12 over a broad area. There are also shown in FIG. 1 a frame 16 and a glass 18.

The hand scanner 10 has some problems left unsolved, as follows. The two rollers 14a and 14b located at both sides of the document reading section 12 rotate independently of each other, i.e., they are not interlocked to each other. Therefore, the scanner 10 is apt to meander when moved by hand due to a difference in rotation between the rollers 14a and 14b. Moreover, the image read by the scanner 10 must be corrected due to the meandering. For the correction, it is necessary that an encoder be associated with each of the rollers 14a and 14b in order to detect the displacement of the associated roller. Image data representative of the image are corrected on the basis of a difference between the displacements of the rollers 14a and 14. This kind of procedure is time- and labor-consuming.

Figure 2:
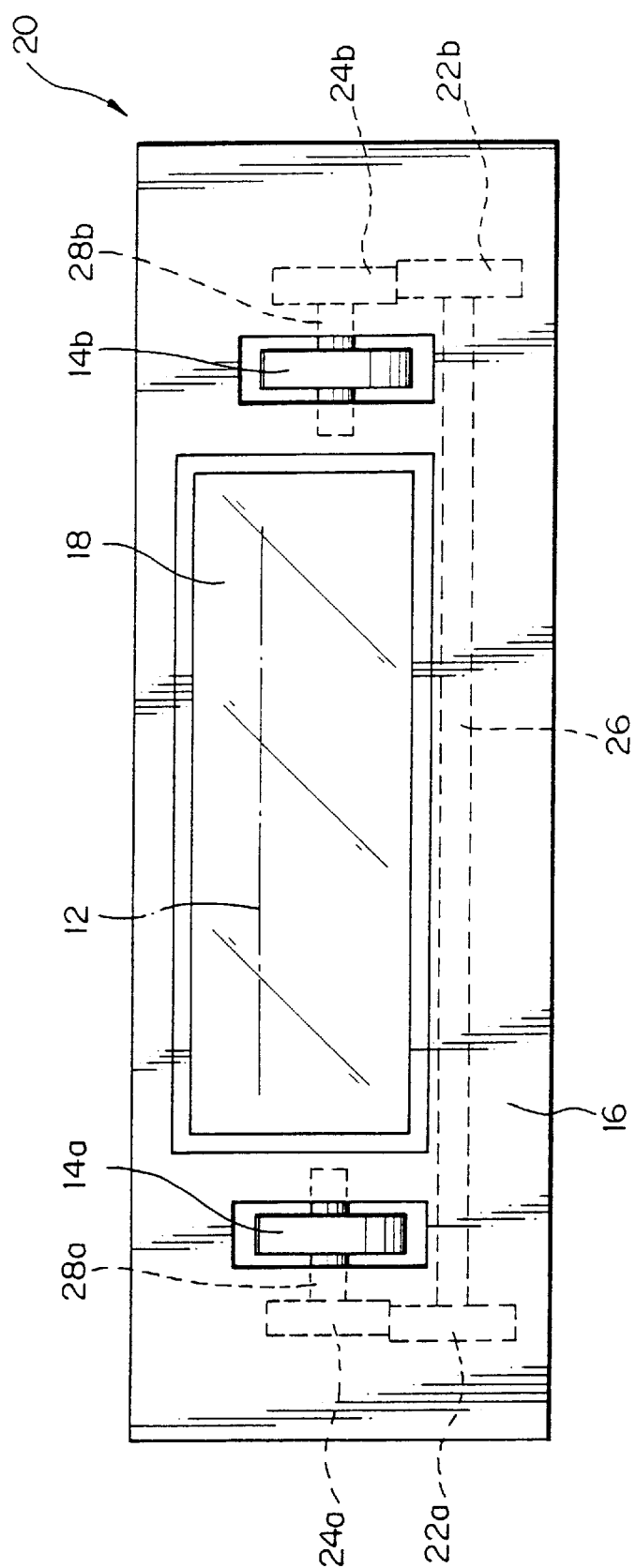

FIG. 2 shows another conventional hand scanner 20. In FIG. 2, the same or similar structural elements as the elements shown in FIG. 1 are designated by identical reference numerals, and a detailed description thereof will not be made in order to avoid redundancy. As shown, the scanner 20, like the scanner 10, has the rollers 14a and 14b at both sides of the image reading section 12. The difference is that the rollers 14a and 14b are interlocked to each other by gears 22a, 22b, 24a and 24b and a shaft 26. The shaft 26 extends parallel to roller shafts 28a and 28b supporting the rollers 14a and 14b, respectively. In this configuration, the rollers 14a and 14b are rotatable in interlocked relation to each other.

In operation, while the scanner 20 is moved over a document with the rollers 14a and 14b rolling on the document, the rotation of one of the rollers 14a and 14b is transmitted to the other roller via the gears 22a, 22b, 24a and 24b and shaft 26. If the gear ratio between the gears 24a and 24b is selected to be 1:1, then the rollers 14a and 14b rotate at the same speed as each other and prevent the scanner 20 from meandering. However, the problem with the scanner 20 is that it needs an extra space for accommodating the gears 22a–24a and shaft 26, resulting in a bulky and complicated construction.

Figure 3A:
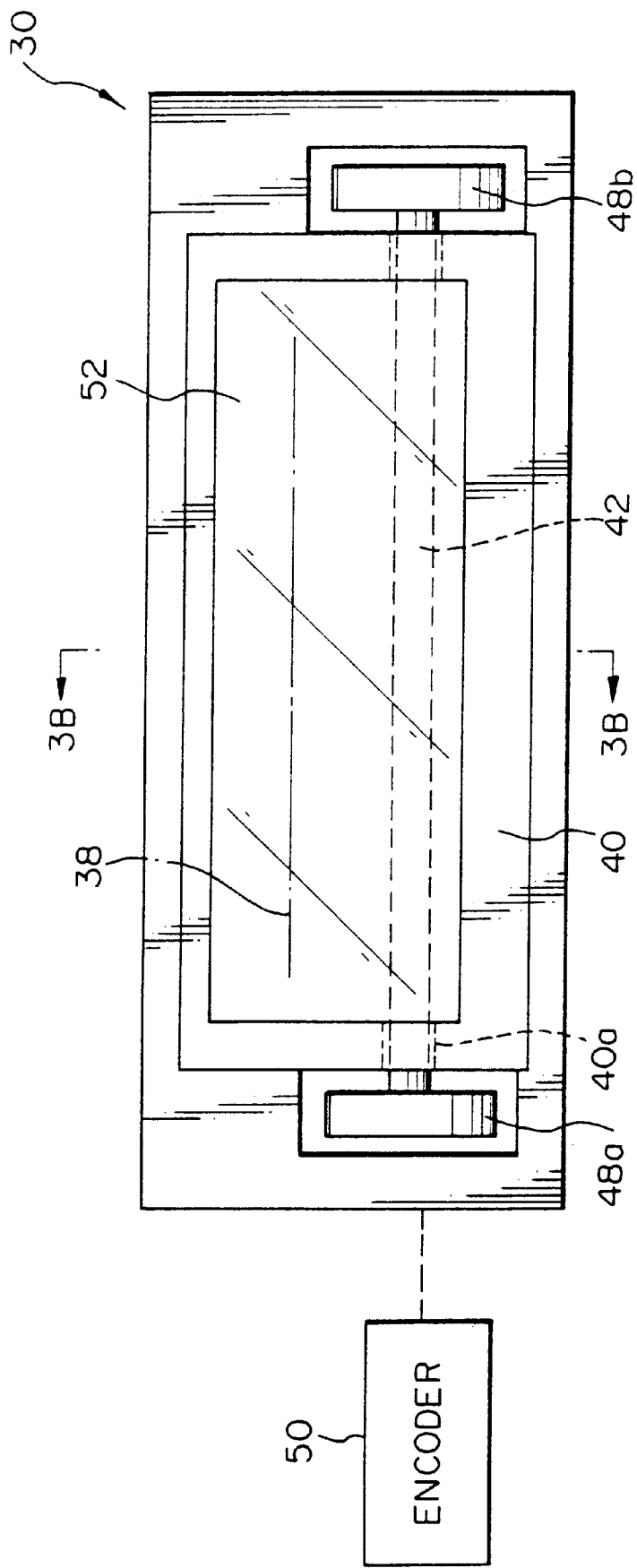
FIG. 3A is a bottom view of a hand scanner embodying the present invention.
Figure 3B:
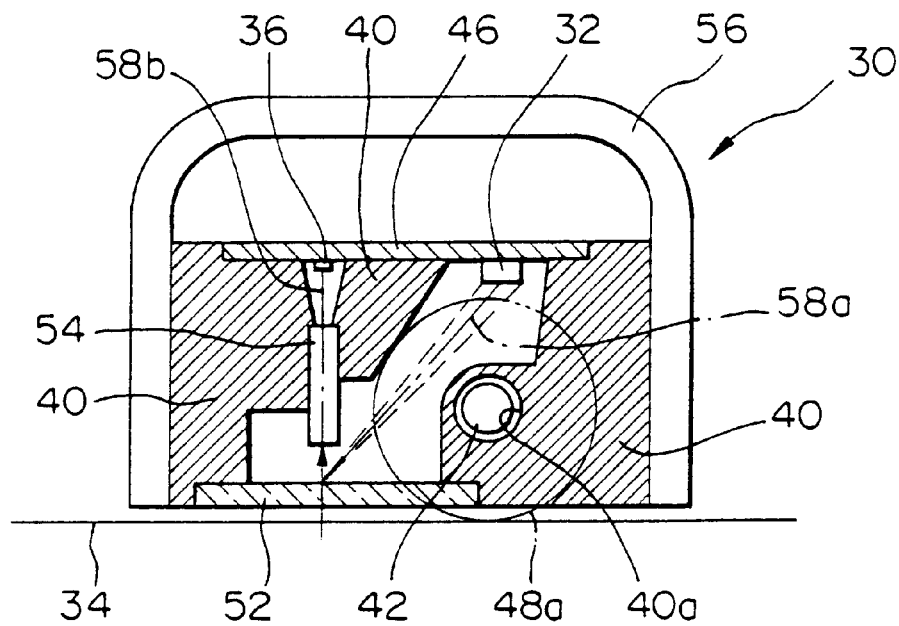
FIG. 3B is a section along line 3B—3B of FIG. 3A.

Referring to FIGS. 3A and 3B, a hand scanner embodying the present invention is shown and generally designated by the reference numeral 30. As shown, the scanner 30 includes a light source 32 for illuminating a document 34. A sensor 36 receives the resulting reflection from the document 34 via a document reading section 38, and transforms it to an electric signal. A frame 40 supports the light source 32 and sensor 36. A rotatable shaft 42 extends throughout the frame 40.

Rollers 44a and 44b are mounted on both ends of the shaft 42.

The light source 32 is implemented by LEDs (Light Emitting Diodes) and affixed to a base plate 46 which is, in turn, affixed to the frame 40. Of course, LEDs may be replaced with a laser. The sensor 36 for receiving the reflection from the document 34 is also affixed to the base plate 46. The sensor 36 is a CCD (Charge Coupled Device) image sensor for transforming incident light to a corresponding electric signal. A preselected space is formed in the frame 40 so as to allow light issuing from the light source 32 to pass therethrough. The shaft 42 is received in holes 40a formed in the opposite side walls of the frame 40 via bearings, not shown. As shown in FIG. 3B, the shaft 42 is positioned outside of a triangle defined by an optical path extending from the light source 32 to the sensor 36 by way of the reading section 38, and positioned close to the part of the path between the light source 32 and the reading section 38.

The shaft 42 therefore does not interfere with the path extending from the light source 32.

The rollers 48a and 48b affixed to both ends of the shaft 42 allow the scanner 30 to run over the document 34 while scanning it. The opposite ends of the shaft 42 supporting the rollers 48a and 48b are slightly protruded from the frame 40.

Because the rollers 48a and 48b are affixed to the shaft 42, they are rotatable at the same speed as each other. An encoder 50 is connected to the shaft 42 or the roller 48a or 48b. The encoder 50 senses the rotation speed of the rollers 48a and 48b and transforms it to the displacement of the scanner 30. A bidimensional image is formed on the basis of the displacement of the scanner 30 and image data output from the scanner 30.

A glass 52 is fitted on the document reading side of the frame 40. The glass 52 allows the light issuing from the light source 32 and the resulting reflection from the document 34 to pass therethrough. In addition, the glass 52 prevents impurities from entering the space formed in the frame 40. A Selfoc lens array 54 is interposed between the reading section 38 and the sensor 36 such that the reflection from the document 34 is propagated through the lens array 54 to the sensor 36.

The structural elements stated above are affixed to the frame 40. A cover 56 covers the frame 40 except for the image reading side of the frame 40.

In operation, light issuing from the light source 32 illuminates the document 34 via an optical path 58a formed in the space of the frame 40 and the glass 52. The resulting imagewise reflection from the document 34 is transmitted through the glass 52 and then partly propagated through the lens array 54, i.e., an optical path 58b to reach the sensor 36.

The quantity of light to be incident to the reading section 38 is small when the document image is dark, or great when it is light.

While the scanner 30 scans the document 34, the rollers 48a and 48b roll on the document 34. The encoder 50 transforms the rotation speed of the rollers 48a and 48b to the displacement of the scanner 30. As a result, the image incident to the reading section 38 and the position of the image in a bidimensional plane are allowed to correspond to each other. A bidimensional image is formed as the scanner 30 scans the entire document 34. Because the rollers 48a and 48b affixed to the shaft 42 rotate at the same speed as each other, the scanner 30 can move linearly without meandering.

A friction member having a great coefficient of friction may be provided on the circumferential surface of each roller 48a or 48b. Such friction members will prevent the rollers 48a and 48b from slipping on the document 34 and insure the linear movement of the scanner 30, thereby enhancing image quality. If desired, another pair of rollers identical with the rollers 48a and 48b may be mounted on the scanner 30 and interlocked to each other.

Figure 4:
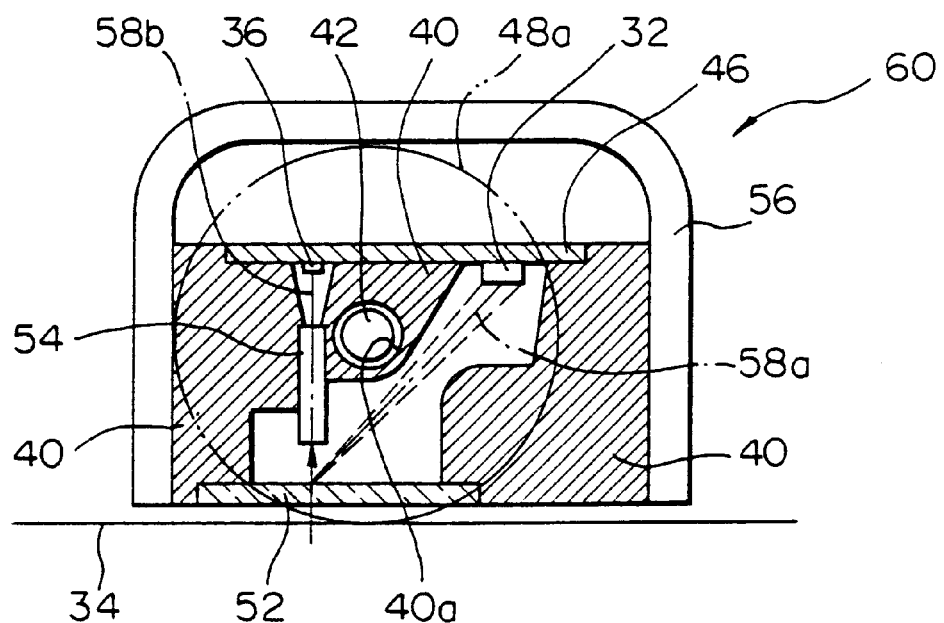
FIG. 4 is a sectional side elevation showing a modification of the embodiment of FIG. 3A.

FIG. 4 shows a modification of the above embodiment. As shown, a hand scanner 60 is essentially similar to the hand scanner 30 except for the following. The holes 40a formed in the opposite side walls of the frame are positioned between the optical path 58a extending from the light source 32 and the optical path 58b extending to the sensor 36, without interfering with either one of the paths 58a and 58b. As to the rest of the construction, the modification is identical with the previous embodiment.

The above embodiment and its modification has the following unprecedented advantages. The rollers 48a and 48b are affixed to a single shaft 42 and located at both sides of the image reading section 38. This, coupled with the fact that the shaft 42 extends throughout the frame 40, reduces the overall size of the hand scanner. Further, because the rollers 48a and 48b are directly affixed to the shaft 42 and rotatable at the same speed as each other in frictional contact with the document 34, the scanner can be easily operated by hand without meandering. Moreover, because the scanner is capable of reading an image accurately despite the manual operation, it obviates the previously stated conventional time- and labor-consuming procedure for the correction of image data ascribable to meandering. In addition, the overall scanner arrangement is simple because a sensor and control for the correction of the image data are needless and because a shaft and gears for interlocking the rollers 48a and 48b are not necessary.

Figure 5:
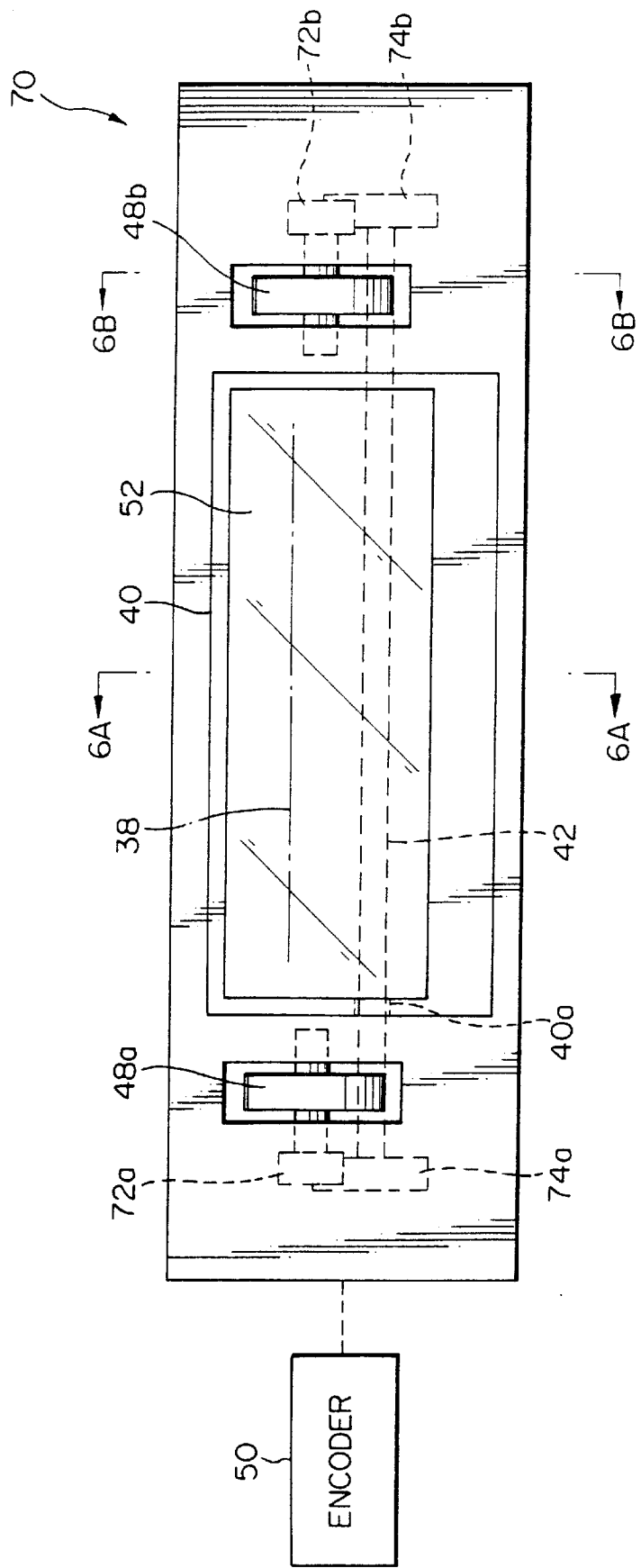
FIG. 5 is a bottom view showing an alternative embodiment of the present invention.
Figure 6A:
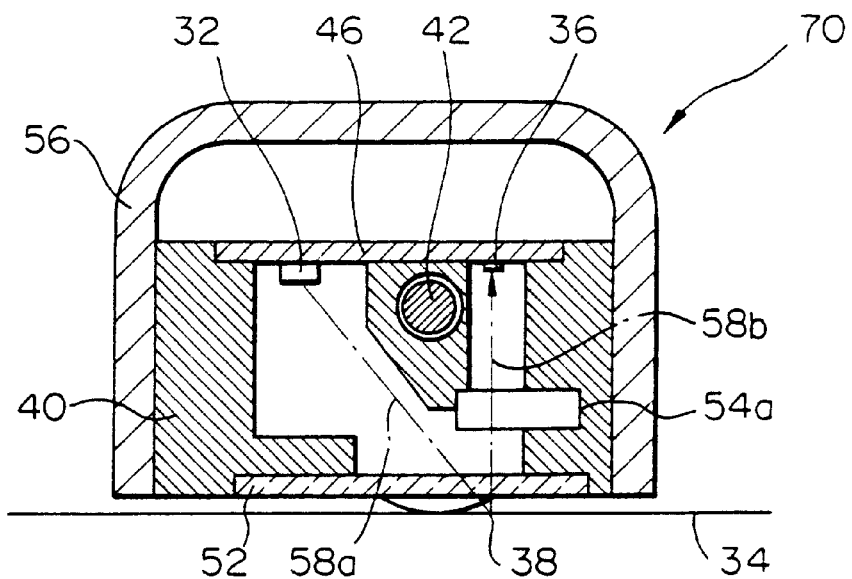
FIG. 6A is a section along line 6A—6A of FIG. 5.
Figure 6B:
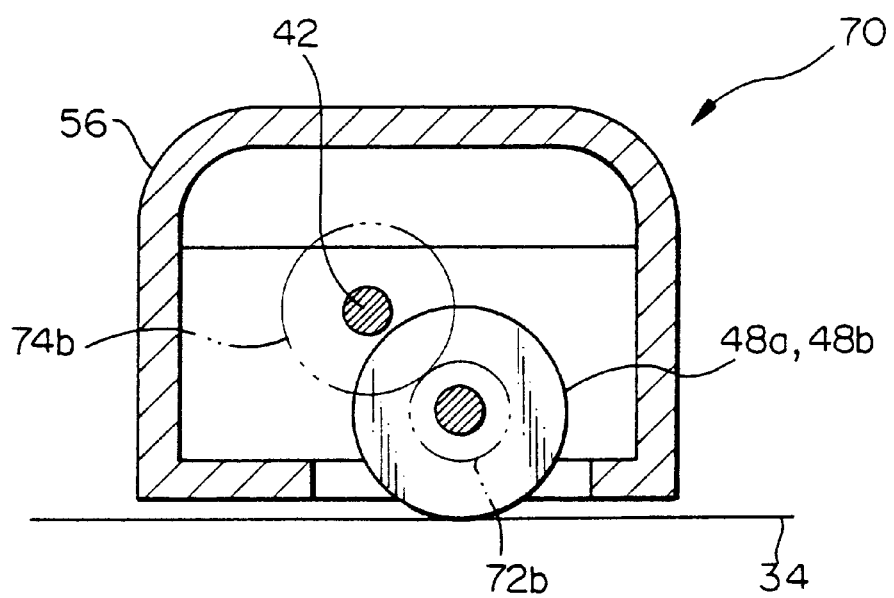
FIG. 6B is a section along line 6B—6B of FIG. 5.

Referring to FIGS. 5, 6A and 6B, an alternative embodiment of the present invention will be described. In FIGS. 5, 6A and 6B, the same or similar structural elements as the elements shown in FIGS. 2–4 are designated by identical reference numerals, and a detailed description thereof will not be made in order to avoid redundancy. As shown, a hand scanner, generally 70, has the light source 32, sensor or CCD image sensor 36, frame 40, and shaft 42 extending throughout the central portion of the frame 40. In this embodiment, the rollers 48a and 48b are rollably mounted on the frame 40 at both sides of the frame 40 with respect to the main scanning direction. The scanner 70 additionally includes a mechanism for transmitting the rotation of the rollers 48a and 48b to the shaft 42. The transmission mechanism is implemented by roller gears 72a and 72b coaxial with the rollers 48a and 48b, respectively, and shaft gears 74a and 74b meshing with the gears 72a and 72b, respectively. As shown in FIG. 6B, in the illustrative embodiment, the shaft 42 is positioned inside of the triangle defined by the optical path extending from the light source 32 to the sensor 36 by way of the reading section 38, and positioned close to the part of the path between the light source 32 and the reading section 38. The shaft 42 therefore does not interfere with the path extending from the light source 32. In the illustrative embodiment, a binary lens 54a is substituted for the Selfoc lens array 54.

It will be seen that the rollers 48a and 48b of the above arrangement also rotate at the same speed as each other via the transmission mechanism, e.g., gears 72a, 72b, 74a and 74b and shaft 42. Therefore, the scanner 70 is capable of moving linearly without meandering. The frictional members and/or the four-roller configuration mentioned in relation to the previous embodiment may also be applied to this embodiment.

Figure 8A:
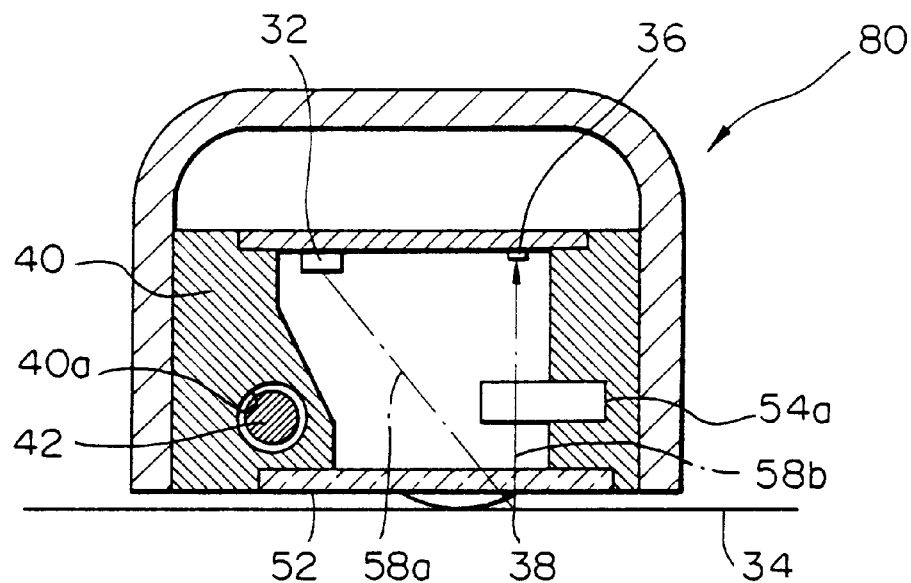
FIG. 8A is a section along line 8A—8A of FIG. 7.
Figure 8B:
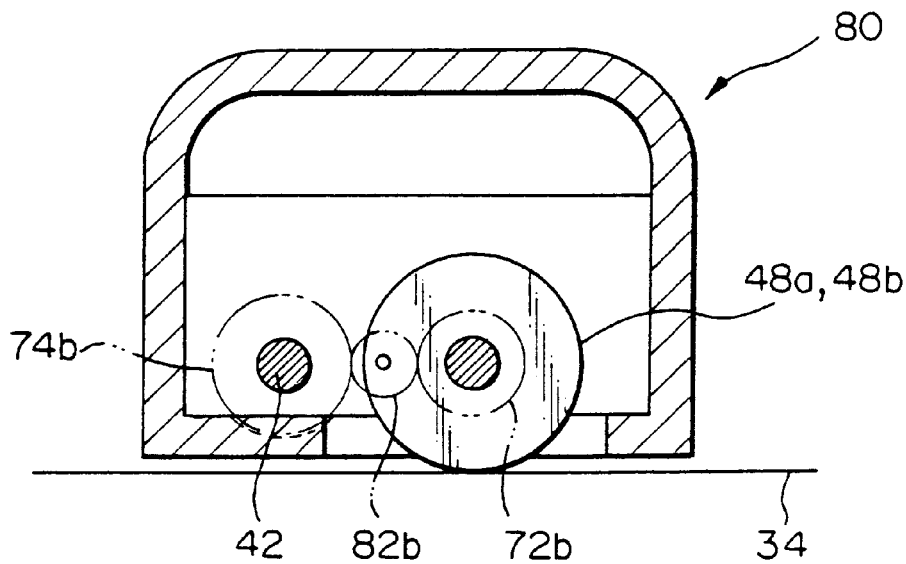
FIG. 8B is a section along line 8B—8B of FIG. 7.

FIGS. 7, 8A and 8B show a modification of the hand scanner 70. As shown, a hand scanner, generally 80, is essentially identical with the scanner 70 except for intermediate gears 82a and 82b. The intermediate gear 82a is held in mesh with the roller gear 72a and and shaft gear 74a while the intermediate gear 82b is held in mesh with the roller gear 72b and shaft gear 74b. The rollers 48a and 48b and the shaft 42 are spaced by a preselected distance.

However, the intermediate gears 82a and 82b respectively intervening between the gears 72a and 74a and the gears 72b and 74b allow the sizes of the gears 72a, 72b, 74a and 74b to be reduced. This enhances the freedom of the spaces where the gears 82a, 72b, 74a, 74b, 82a and 82b are densely arranged.

This embodiment achieves the following advantages in addition to the advantages described in relation to the previous embodiment. Because the rollers 48a and 48b are interlocked to each other by the transmission mechanism and a single shaft 42 and because the shaft 42 extends throughout the central portion of the frame 40, the overall hand scanner is small in size. The intermediate gears 82a and 82b allow the sizes of the roller gears 72a and 72b and shaft gears 74a and 74b to be reduced, enhancing the efficient use of the spaces available at both sides of the frame 40, and therefore design freedom.

Various modifications will become possible for those skilled in the art after receiving the teachings of the present disclosure without departing from the scope thereof.

What is claimed is:

1. A hand scanner comprising:

a light source for illuminating a document;

a sensor for transforming a resulting reflection from the document received via a document reading section to a corresponding electric signal;

a frame supporting said light source and said sensor;

a shaft extending through said frame;

a pair of rollers positioned at both sides of said frame with respect to a main scanning direction;

transmitting means for transmitting rotation of said pair of rollers to said shaft, said transmitting means including:

a pair of roller gears coaxial with said pair of rollers, respectively;

a pair of shaft gears coaxial with said shaft; and a pair of intermediate gears each meshing with one of said pair of roller gears and one of said pair of shaft gears;

wherein a light source optical path extends from said light source, a sensor optical path extends from said sensor, and said shaft non-interferingly extends in a space defined by said light source optical path and said sensor optical path.

2. A hand scanner as claimed in claim 1, wherein said shaft extends throughout a central portion of said frame.

3. A hand scanner comprising:

a light source for illuminating a document;

a sensor for transforming a resulting reflection from the document received via a document reading section to a corresponding electric signal;

a frame supporting said light source and said sensor;

a shaft extending through said frame;

a pair of rollers mounted on said frame at both sides of said frame with respect to a main scanning direction; and transmitting means for transmitting rotation of said pair of rollers to said shaft;

said shaft extending through a central portion of said frame;

wherein a light source optical path extends from said light source, a sensor optical path extends from said sensor, and said shaft non-interferingly extends in a space defined by said light source optical path and said sensor optical path.

4. A hand scanner as claimed in claim 3, wherein said transmitting means comprises gear members meshing with said pair of rollers and said shaft.

5. A hand scanner comprising:

a light source for illuminating a document;

a sensor for transforming a resulting reflection from the document received via a document reading section to a corresponding electric signal;

a frame supporting said light source and said sensor;

a rotatable shaft extending through said frame; and a pair of rollers affixed to opposite ends of said shaft;

wherein a light source optical path extends from said light source, a sensor optical path extends from said sensor, and said rotatable shaft non-interferingly extends in a space defined by said light source optical path and said sensor optical path.

* * * * *